United States Patent [19]

Prysock

[11] Patent Number: 4,977,643
[45] Date of Patent: Dec. 18, 1990

[54] FISH SKINNING DEVICE, AND METHODS OF CONSTRUCTING AND UTILIZING SAME

[76] Inventor: Arnold Prysock, 10423 Capitol Pl., St. Louis, Mo. 63131

[21] Appl. No.: 330,744

[22] Filed: Mar. 30, 1989

[51] Int. Cl.$^5$ ............................................. A22C 11/00
[52] U.S. Cl. .................................................... 452/187
[58] Field of Search ...................... 17/44, 44.2, , 44.3, 17/21, 62, 50, 53; 248/317, 340

[56] References Cited

U.S. PATENT DOCUMENTS

| | | | |
|---|---|---|---|
| 508,711 | 11/1893 | Hilsher | 17/44 |
| 1,259,109 | 3/1918 | Kugler et al. | 17/70 |
| 2,312,160 | 2/1943 | Haislip | 17/70 |
| 3,019,474 | 2/1962 | Hughes | 17/68 |
| 3,199,820 | 8/1965 | Thompson | 17/44.2 |
| 3,854,168 | 12/1974 | Bradley | 17/44.2 |
| 4,054,969 | 10/1977 | Vogt | 17/68 |
| 4,759,101 | 7/1988 | Hyatt | 17/70 |

Primary Examiner—Willis Little
Attorney, Agent, or Firm—Irving M. Weiner; Robert M. Petrik; Pamela S. Burt

[57] ABSTRACT

A device for suspending a fish in spaced relation from a vertical support member such as a post or tree to facilitate skinning, scaling and other cleaning operations. The device includes a brace support structure with two upper downwardly-angled support arms supporting the outer end of a third horizontal support arm, the inner ends of all three arms being fastened to the vertical support member. A hook suspended from a chain supported by the brace support structure is secured to a mouth or head portion of the fish to thus suspend the fish for convenient cleaning operations.

19 Claims, 1 Drawing Sheet

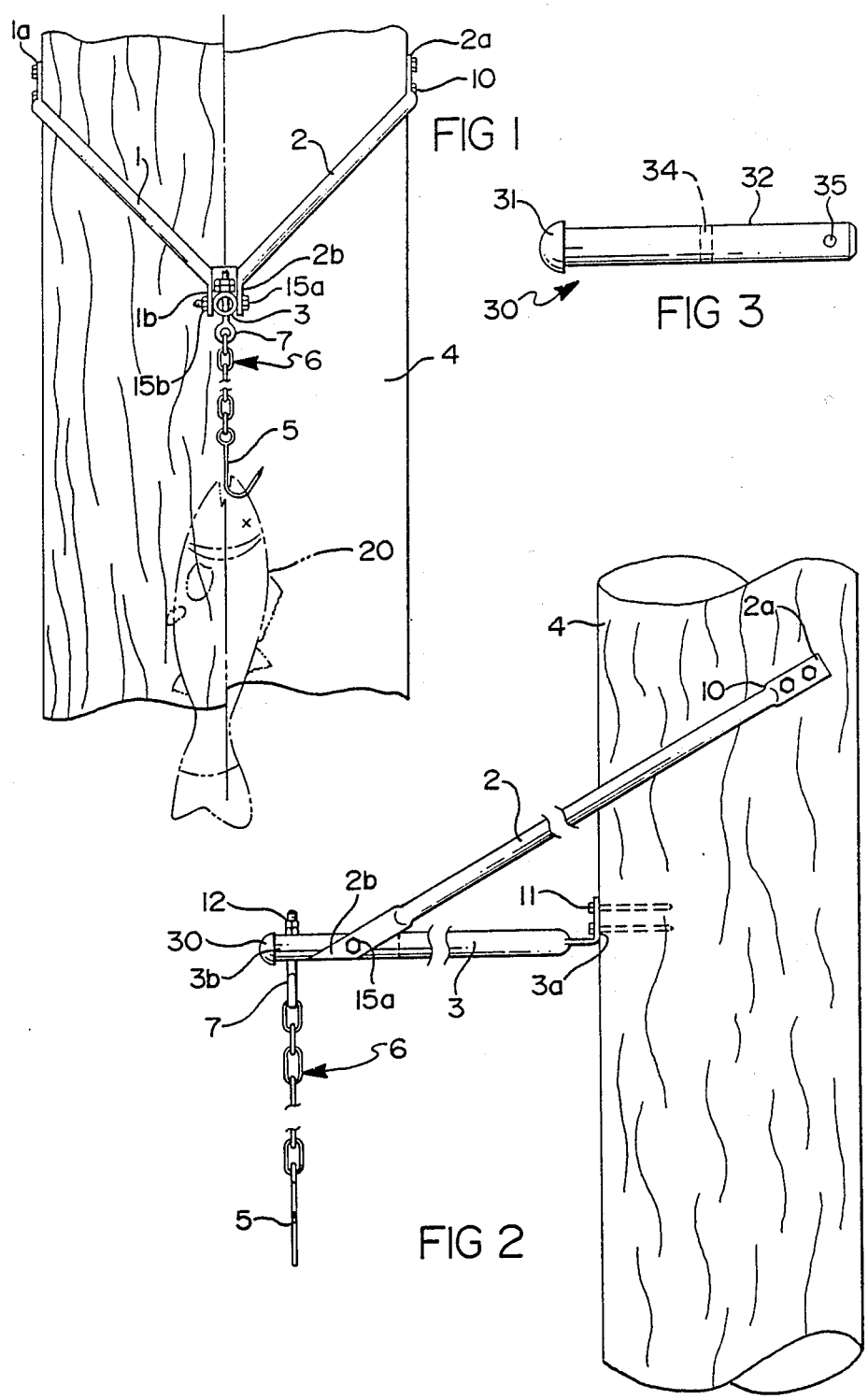

FISH SKINNING DEVICE, AND METHODS OF CONSTRUCTING AND UTILIZING SAME

BACKGROUND OF THE INVENTION

1. Field of the Invention

The present invention relates generally to a device for skinning fish wherein the fish is conveniently suspended from a post, tree or similar vertical support. More particularly, the invention relates to a device for suspending a fish for cleaning operations such as skinning, scaling, etc., such that all sides of the fish are readily accessible, the fish is suspended at a convenient position relative to the user, and debris falls freely out of the way under the force of gravity.

2. Description of Relevant Art

When skinning, scaling or otherwise cleaning fish, problems are encountered with respect to holding the fish in a desirably stable position, accessing all sides of the fish, and contending with messy debris produced during cleaning operations. Various attempts have heretofore been made to surmount these difficulties, as illustrated by the devices disclosed in the following U.S. patents.

U.S. Pat. No. 1,259,109 issued in 1918 to Kugler et al entitled "FISH DRESSING DEVICE" discloses a device for holding a fish for scaling or cleaning, the device including a base with two end holding members. One end holding member is a tail clamp and the other end holding member is a chain with a hook for engaging the head of the fish. The end holding members hold the fish taut over the base to allow cleaning of the fish. The hook may be adjusted to any length fish by the chain.

U.S. Pat. No. 2,312,160 issued in 1943 to Haislip entitled "FISH HANDLING AND SCALING CLAMP" discloses a clamp with a pair of jaws for gripping the tail of a fish, the clamp being anchored to a bench or table.

U.S. Pat. No. 3,019,474 issued in 1962 to Hughes entitled "FISH SKINNING SAW" discloses a saw-like tool with hinged pivotal members for removing the skin of a fish. The tool is used to first pierce the skin of the fish, and then separate the skin from the fish flesh.

U.S. Pat. No. 4,054,969 issued in 1977 to Vogt entitled "FISHING TOOL" discloses a pliers-like tool for skinning a catfish. The tool includes a pair of pivoted jaws with a flat sharpened lower jaw. The tool is used to loosen the skin of, and then skin, the catfish.

U.S. Pat. No. 4,759,101 issued in 1988 to Hyatt entitled "APPARATUS FOR HOLDING SMALL GAME ANIMALS OR FISH DURING SKINNING, SCALING OR BUTCHERING OPERATIONS" discloses an apparatus provided with a set of triangular, serrated jaws for holding a fish or small game. The apparatus may be supported by a tree, fence or post by means of a wire, screw, loop or nail.

The foregoing devices have various shortcomings, such as not permitting convenient access to all parts of the fish, failing to provide secure positioning of the fish, and/or complexity of structure. The present invention overcomes such shortcomings by providing a device for suspending a fish from a conveniently available vertical support (such as a post or tree) so that all parts of the fish are readily accessible, the fish is held securely, and debris is permitted to fall away during cleaning operations. Moreover, the present invention attains these advantages over other known devices with a structure which is simplified and inexpensive to produce.

SUMMARY OF THE INVENTION

The present invention provides a device for supporting fish during skinning, scaling or other cleaning operations, comprising first means for securely engaging a fish; brace support means, connected with the first means, for suspending the first means from a substantially vertical support member such that the first means is horizontally spaced from the support member; and attachment means for attaching the brace support means to the vertical support member.

Preferably, the brace support means comprises first, second and third elongated support arms having first ends thereof adapted to be attached to the vertical support member. The third support arm extends horizontally from the vertical support member, substantially centrally between and below the first and second support arms, and the outer second ends of the first and second support arms are attached to the outer second end of the third support arm such that the first and second support arms define acute angles relative to the third support arm.

In the preferred embodiment, the first means for engaging a fish comprises a hook suspended from a flexible suspending member such as a chain. The device is adapted to be conveniently attached to an available vertical support member, such as a post or tree.

It is an object of the invention to provide a fish support device which is simplified in structure, is easily attached to an existing vertical support member, and permits convenient access to all parts of the fish while securely suspending same.

The above and further objects, details and advantages of the invention will become apparent from the following detailed description, when read in conjunction with the accompanying drawings.

BRIEF DESCRIPTION OF THE DRAWINGS

FIG. 1 is a front elevational view of a device according to the invention in an operable position attached to a vertical support member, such as a post or tree, showing a fish suspended from the device.

FIG. 2 is a side elevational view of the device of FIG. 1.

FIG. 3 illustrates a side view of an end cap in accordance with the present invention.

DETAILED DESCRIPTION OF PREFERRED EMBODIMENTS

With reference to FIGS. 1 and 2, there is shown a device for suspending a fish according to a preferred embodiment of the invention. It will be understood that the device according to the invention may conveniently be attached to an existing vertical support member such as a post or tree, or a post may be erected for use with the invention at a desired location. Although the post or tree 4 is shown in FIGS. 1 and 2 as having a circular cross section, the device according to the invention may also be readily attached to vertical support members of different cross sections, such as a square post, if desired. The height of vertical support 4 should be sufficient to permit attachment of the device according to the invention such that the fish 20 is suspended at a convenient elevation relative to the user's hands.

The invention includes brace support means in the form of first, second and third elongated rigid support arms 1,2,3, respectively. Each of the support arms 1,2,3 is preferably tubular along its length, and may be fabricated of aluminum, hard plastic or a similar rigid and relatively strong material. Support arms 1 and 2 are substantially identical, with flat inner or first ends 1a, 2a for attachment to vertical support 4 and flat outer or second ends 1b, 2b for attachment to support arm 3, as described below. In a preferred embodiment, support arms 1 and 2 are approximately 30" long and have a diameter of approximately ½" to ¾". First ends 1a, 2a are each provided with a pair of apertures approximately 3/16" in diameter, and second ends 1b, 2b are each provided with a single aperture approximately ¼Δ in diameter, by way of example.

Support arm 3, which forms the horizontal member of the brace support means, preferably has a diameter of approximately ¾", and the first end 3a thereof is flat and bent at a right angle to define a flange for attachment to vertical support 4. First end or flange 3a is provided with a plurality of apertures, preferably three, approximately 3/16" in diameter. Preferably, support arm 3 is approximately 22" in length. The second or outer end 3b of support arm 3 may be provided with a circular cap to protect the user from any rough edges. A vertical aperture of approximately ¼" diameter is provided proximal end 3b in support arm 3 (e.g., approximately 1½" from end 3b), and inwardly of such vertical aperture is provided a horizontal aperture adapted to receive fastening means for securing second ends 1b, 2b of support arms 1,2 to arm 3.

FIG. 3 illustrates the cap 30 discussed above to protect the user from rough edges. The cap is adapted to be received by support arm 3 and includes an outer head portion 31 and tube engaging portion 32.

As shown most clearly in FIG. 1, the support arms 1 and 2 have their first ends 1a, 2a fastened to opposite sides of vertical support 4 in opposing relation to each other. Attachment means in the form of nails 10, or other suitable fasteners such as screws, etc., are used to fasten the ends 1a, 2a in diametrically opposite relation to vertical support 4. The first end 3a of support arm 3 is likewise fastened to vertical support 4 by nails 11 or other suitable fasteners received through the apertures in end 3a as shown. The first end 3a is fastened to vertical support 4 a distance below the points at which ends 1a, 2a are fastened, and first end 3a is arranged circumferentially centrally relative to ends 1a, 2a, such that support arm 3 extends horizontally from vertical support 4.

The second ends 1b, 2b of support arms 1,2 are secured to respective opposite sides of support arm 3 adjacent the second end 3b thereof via a bolt 15a and nut 15b, the bolt 15a being passed through the apertures in ends 1b and 2b and the horizontal aperture in end 3b.

As thus arranged, the brace support means includes the upper angled support arms 1 and 2 which define acute angles relative to lower horizontal support arm 3. Support arms 1,2,3 thus together define a very secure brace support means when attached in operable position to vertical support 4.

The means for engaging a fish in accordance with the invention comprises a substantially U-shaped hook 5 which may, for example, be fabricated of galvanized or stainless steel with a 3/16" diameter. Preferably, each leg of U-shaped hook 5 has a length of approximately 5". The upper end of hook 5 is provided with an eye which is in turn connected with a lower link of a chain 6. The chain 6 may comprise, for example, six links of light cow chain extending approximately 9" in length. The uppermost link of chain 6 is connected to an eyebolt 7, the shaft of which is in turn received through the vertical aperture proximal end 3b of support arm 3 and fastened in place by a nut 12. The eyebolt 7 may be mounted for pivotal movement if desired, however, even if eyebolt 7 is secured against pivoting, the chain 6 will afford flexibility in rotating a suspended fish.

In its operable position as shown and described, the device according to the invention provides a very secure support for suspending fish of even relatively large size and/or heavy weight by virtue of the rigid brace support means 1,2,3. Preferably, the device is attached to vertical support 4 such that the hook 5 is suspended approximately five feet from a ground surface, thus being conveniently within reach of the user.

To suspend a fish from the device, the user has merely to insert the hook 5 through a portion of the mouth or head of the fish. Once the fish is suspended, the user will have ready access to virtually all parts of the fish, thus facilitating skinning, scaling and/or other cleaning operations. As thus suspended, skinning of a fish such as a catfish having a tough and inedible skin can be easily accomplished, preferably working in a downward direction. Debris generated during skinning, scaling or other cleaning operations will fall downwardly under the force of gravity, thus preventing such debris from becoming a nuisance to the user as he/she works on the fish.

Another major advantage afforded by the present invention is its simplified structure, which renders it inexpensive to produce and very easy to mount in position on a vertical support.

While there have been described what are at present considered to be the preferred embodiments of the invention, it will be understood that various modifications may be made therein without departing from the spirit or scope of the invention. The present embodiments are therefore to be considered in all respects as illustrative, and not restrictive. The scope of the invention is indicated by the appended claims.

I claim:

1. A device for supporting fish during skinning, scaling or other cleaning operations, comprising:
    first means for securely engaging a fish;
    brace support means, connected with said first means and a horizontal member connecting said brace means and said first means, for suspending said first means from a substantially vertical support member such that said first means is horizontally spaced from said support members;
    attachment means for attaching said brace support means to said vertical support member; and
    an end cap provided on said horizontal member.

2. A device according to claim 1, wherein:
    said brace support means comprises first and second elongated support arms having first ends thereof adapted to be attached to opposite sides of said vertical support member via said attachment means.

3. A device according to claim 2, wherein:
    said brace support means further comprises said horizontal member which is a third elongated support arm having a first end thereof adapted to be attached to said vertical support member via said attachment means.

4. A device according to claim 3, wherein:
    said third support arm includes a bent flange portion at said first end thereof for attachment to said vertical support member; and said third support arm extends substantially horizontally from said vertical support member when attached thereto.

5. A device according to claim 4, wherein:
said first and second elongated support arms have second ends thereof attached to said third support arm proximal a second end of said third support arm in an operable position of said device; and
in said operable position, said first ends of said first and second support arms are attached to said vertical support member at higher positions than the position at which said first end of said third support arm is attached to said support member.

6. A device according to claim 5, wherein:
said third support arm extends substantially centrally between and below said first and second support arms in said operable position; and
said first and second support arms each define an acute angle relative to said third support arm.

7. A device according to claim 6, wherein:
said attachment means comprises a plurality of fasteners adapted to be received through apertures provided in said first ends of each of said support arms and to be secured to said vertical support member.

8. A device according to claim 6, wherein:
each of said first, second and third support arms comprises an elongated tubular member.

9. A device according to claim 1, wherein:
said first means comprises a hook adapted to be securely engaged with a head or mouth portion of a fish to be suspended; and
said hook is suspended from said second end of said third support arm.

10. A device according to claim 6, wherein:
said first means comprises a hook adapted to be securely engaged with a head or mouth portion of a fish to be suspended; and
said hook is suspended from said second end of said third support arm.

11. A device according to claim 9, wherein:
said hook is suspended from said second end of said third support arm via a length of chain.

12. The device of claim 1, wherein:
said end cap includes an inwardly projecting member and an outer protective end.

13. A device for suspending an object from a vertical support member, comprising:

first and second substantially rigid elongated support arms having first ends adapted to be respectively attached to opposite side portions of said vertical support member;
a third substantially rigid elongated support arm having a first end adapted to be attached to said vertical support member such that said third support arm extends horizontally from said vertical support member;
said first and second support arms having second ends connected to an outer second end of said third support arm so as brace and support same; and
a hook member suspended downwardly from said second end of said third support arm.

14. A device according to claim 13, wherein:
said device is adapted to be attached to a vertical support member having a substantially circular cross section, such as a post or tree;
said first, second and third support arms each comprise a tubular member; and
said first ends of each of said first, second and third support arms are substantially flat with at least one aperture provided therein; and
said device further comprises a plurality of fasteners adapted to be received through said apertures and to be secured to said vertical support member.

15. A device according to claim 14, wherein:
said hook member is suspended downwardly from said second end of said third support arm via a length of chain.

16. A device according to claim 15, wherein:
said third support arm extends substantially centrally between and below said first and second support arms in an operable position of said device; and
said first and second support arms each define an acute angle relative to said third support arm.

17. A device according to claim 16, wherein:
said third support arm includes a bent flange portion at said first end thereof for attachment to said vertical support member.

18. A device according to claim 15, wherein:
said hook member is supported by said chain from said second end of said third support arm so as to be pivotable.

19. The device of claim 13, wherein:
said third support arm includes an end cap fitted within said second end.

* * * * *

UNITED STATES PATENT AND TRADEMARK OFFICE
CERTIFICATE OF CORRECTION

PATENT NO. : 4,977,643

DATED : December 18, 1990

INVENTOR(S) : Arnold PRYSOCK

It is certified that error appears in the above-identified patent and that said Letters Patent is hereby corrected as shown below:

Column 3, line 11, change "$\frac{1}{4}\Delta$" to --$\frac{1}{4}$"--.

Column 6, line 12 (Claim 13, line 14), after "as" insert --to--;
 line 45 (Claim 19, line 1), change "13" to --14--.

Signed and Sealed this

Sixth Day of October, 1992

*Attest:*

DOUGLAS B. COMER

*Attesting Officer*  *Acting Commissioner of Patents and Trademarks*